Dec. 7, 1971      GEORGE M. LOW, DEPUTY      3,625,084
    ADMINISTRATOR OF THE NATIONAL AERONAUTICS
              AND SPACE ADMINISTRATION
          FLEXIBLE/RIGIDIFIABLE CABLE ASSEMBLY
                  Filed Sept. 21, 1970
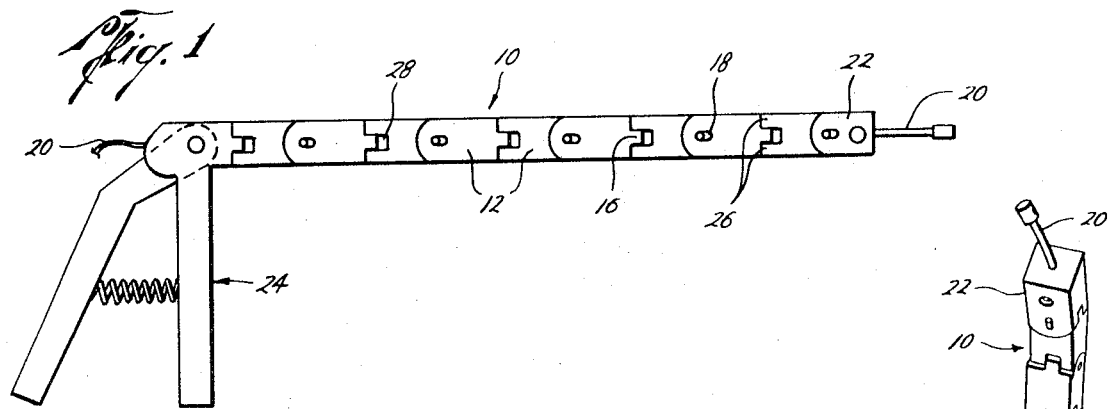
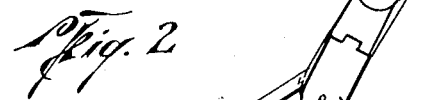
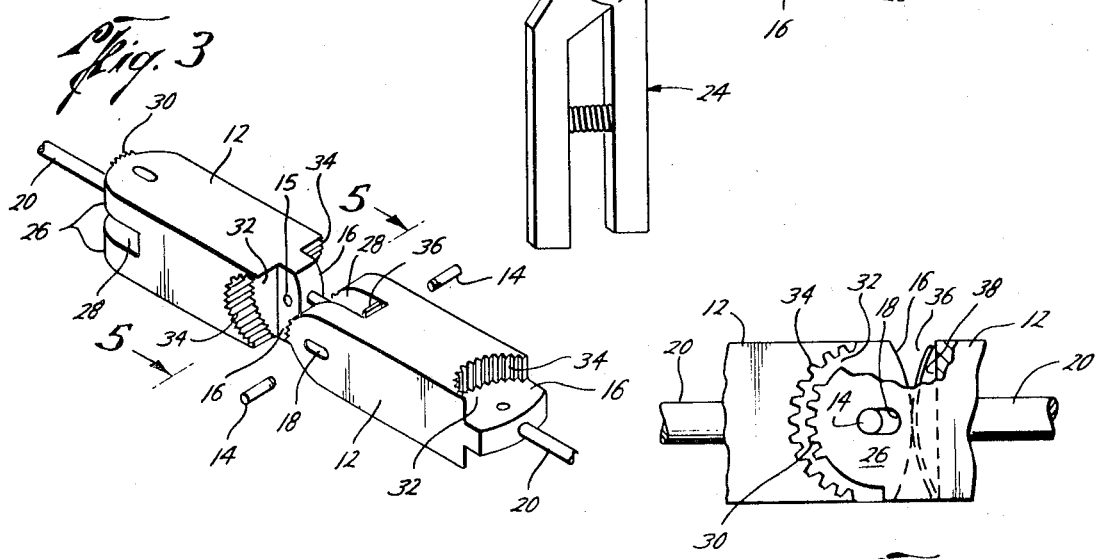
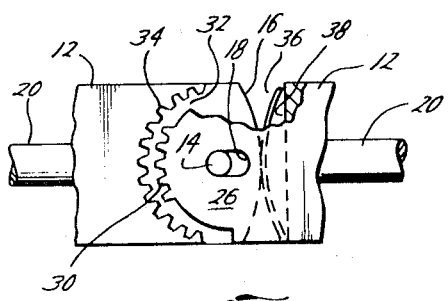
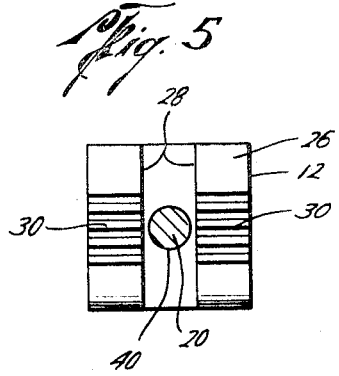
Cletus J. Siebert
        INVENTOR.
BY  Wu Marconteu
                    ATTORNEY

United States Patent Office 3,625,084
Patented Dec. 7, 1971

3,625,084
FLEXIBLE/RIGIDIFIABLE CABLE ASSEMBLY
George M. Low, Deputy Administrator of the National Aeronautics and Space Administration, with respect to an invention of Cletus J. Siebert, Littletown, Colo.
Filed Sept. 21, 1970, Ser. No. 73,932
Int. Cl. F16c 1/00
U.S. Cl. 74—501 R                                    9 Claims

ABSTRACT OF THE DISCLOSURE

A flexible yet rigidifiable cable assembly capable of being selectively tensioned. A plurality of elongate link members each have an axial bore to receive a cable. At one end of each link member are two spaced, parallel projections providing a slot therebetween, the projections having serrations at their apex. At the second end of each link member is a projecting tongue having serrated, semi-circular reliefs on either side. In assembled relation, the parallel projections of one end of a link member are engageable with and journaled to the semi-circular reliefs on either side of the tongue of another link member. A spring between each link member permits flexibility of the cable assembly by maintaining the links in a disengaged relation, the cable assembly being rigidifiable upon overcoming the bias of the springs through tensioning of the cable whereby the links engage.

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

The present invention is generally directed to an improved flexible yet rigidifiable cable assembly adapted for use, among other things, as an astronaut tether although the assembly is capable of other uses as will be explained. In the past, tether designs have generally incorporated ball and socket link or joint members requiring a high degree of friction between members to lock the tether in a fixed mode. The requisite friction for locking the tether has usually been provided through tensioning of a cable linking the joints, such tension being placed on the cable by means of, for example, an electrical motor drive. However, the ball and socket type of tether provides only low relative resistance to break-away loads, i.e., is not capable of securing heavy loads in a rigid position. The present invention is directed to a device that overcomes these problems.

SUMMARY OF THE PRESENT INVENTION

The cable assembly of the present invention is flexible yet rigidifiable and will support relatively high break-away loads. These characteristics are provided by means of link members maintained in an engageable relation by a cable which can be selectively tensioned to lock each link with respect to an adjacent link. The locking effect provides rigidity to the cable assembly and is accomplished by meshing of serrated groove means integrally formed at one end of each link member with serrated tongue means integrally formed at the end of an adjoining link member.

It is, therefore, an object of the present invention to provide a cable assembly device uniquely adapted for use as, for example, an astronaut tether, the cable assembly being flexible yet rigidifiable when tension is applied by cable to links within the assembly.

A further object of the present invention is the provision of such a cable assembly wherein a plurality of engageable serrated tongue and groove link members are journaled together and axially receive a cable which can be selectively tensioned to engage or disengage one link means relative to another.

A still further object of the present invention is the provision of such an improved cable assembly wherein a portion of the link members are journaled so as to rotate one with respect to the other in planes perpendicular to rotary movement of other link members.

Still other objects, features and advantages will be apparent in the following description of the preferred embodiment of the invention given for the purpose of disclosure and taken in conjunction with the accompanying drawings wherein like character references represent like parts throughout the several views.

DESCRIPTION OF THE DRAWINGS

In the drawings forming a part of the disclosure herein,

FIG. 1 is an elevational view showing the cable assembly of the present invention in a rigidified mode, FIG. 2 is an elevational view of the same assembly shown in a flexed mode, FIG. 3 is an exploded partial view of adjoining link members in the cable assembly, FIG. 4 is a partial cross-sectional side view of engageable serrated tongue and groove portions of the ends of link members, and FIG. 5 is an end view taken along the line 5—5 of FIG. 3 showing the groove means of one end of a link member.

DESCRIPTION OF THE PREFERRED EMBODIMENT

With reference to the drawings and particularly FIG. 1, the flexible, rigidifiable cable assembly of the present invention is illustrated in the rigidified or taut position while in a rectilinear orientation. In contrast, the same cable assembly is illustrated in FIG. 2 in the flexed and non-rectilinear position but can be made rigid in the non-rectilinear position as will be explained. The cable assembly device is uniquely suited as an astronaut tether but is also useful in other aerospace applications such as an experiment positioning-holding device, a work lamp positioning-holding device, a tether to link space cluster embodiments to shuttles and the like. Of course, the device of the present invention is useful in any circumstance requiring a flexible yet rigidifiable holding device for remote operations as, for example, in the nuclear and medical arts and may find further application as, for example, in arch structures and bridge sections in the construction art.

With reference generally to FIGS. 1 and 2 and to FIG. 3 for detail, the cable assembly 10 includes a plurality of engageable, serrated tongue and groove type links 12, each link being journaled to another link by journal pins 14 secured to (such as by a press-fit within holes 15) and projecting from the tongue 16 formed at the end of each link member 12. The journal pins engage journal holes 18 formed in the ends of adjoining link members 12 thereby providing at least limited rotational movement of one link member 12 relative to another by virtue of the journal relationship.

Each link member 12 is adapted to axially receive a cable member 20. As shown in FIGS. 1 and 2, the cable 20 is secured to an anchor link 22 at one end while engaging a lever actuator 24 at the opposed end. The lever actuator 24 provides a means for selectively tensioning the cable 20, functioning by means of a conventional over-center cam or spring loaded jams acting to pull the cable 20 from the anchor link 22 toward the lever actuator 24. It should be noted that both the lever actuator member 24 and the anchor link 22 are journaled to and engageable with the link members 12 as described above with reference to links 12.

As shown in FIG. 3, each link member 12 is provided with engageable serrated tongue and groove means at either end thereof. The serrated groove means is formed at one end by two spaced, parallel projections 26 having a slot 28 therebetween, the projections being of an approximate semi-circular configuration in the parallel planes as shown. Each projection 26 has serrations such as small gear teeth 30 at the apex thereof perpendicular to the parallel planes of the projections.

The serrated tongue means which is integrally formed at the end of each link member 12 opposed to the projections 26 includes the tongue 16 which is formed by parallel, semi-circular reliefs 32 on opposed sides of the tongue 16. Formed on the innermost, semi-circular surface of each relief are serrations or gear teeth 34 positioned perpendicularly to the plane of the tongue 16 as shown.

With reference to FIG. 4, the ends of adjacent link members 12 are shown in journaled relation wherein the journal pin 14 extending from the tongue 16 of one link member engages the journal hole 18 of the projection 26 of another link member. The serrations or gear teeth 30 of the projection 26 are shown in adjacent yet disengaged position relative to the serrations or gear teeth 34 of the relief 32. This disengaged relationship is maintained by virtue of a bow spring 36 which bears against the butt 38 of the slot (28) between the projections 26. The bow spring 36 also bears against the apex of the tongue 16 thereby biasing the link members 12 apart from one another and has a central aperture to accommodate the cable 20. Reference is made at this point to FIG. 5 which more clearly shows the groove means comprising the slot 28 and serrations or gear teeth 30. Also illustrated in FIG. 5 is the axial relationship of the cable 20 with each link member 12, the cable 20 being received within an aperture 40 axially of the link member.

In operation, any desired cleavage means may be secured to the cable assembly device 10 such as by attachment to the anchor link 22 and the cable 20 projecting from such anchor link. In the case of an astronaut tether or the like, a conventional distal connector (not shown) would likely be attached to the anchor link 22 to in turn be attached to any anchor support that an astronaut may desire.

The cable assembly 10 or tether may be made flexible by releasing tension on the cable 20. Under such circumstances, each link member 12 is forced apart from its adjacent link member 12 by means of the bow spring 36 as shown in FIG. 4. It is prefererd that the tongue member 16 with associated reliefs 32 be oriented in a plane perpendicular to the plane of the parallel projections 26 of each link member so that the direction of rotation of one joint within the cable assembly is perpendicular to the direction of rotation of the next succeeding joint in the assembly. This preferred perpendicular relationship is illustrated, for example, in detail in FIG. 3 and generally in FIGS. 1 and 2.

When the cable assembly or tether is to be rigidified, the lever device 24 is squeezed such as by hand to operate, for example, an over-center cam arrangement (not shown) coacting with the cable 20 whereby the latter is drawn taut. Accordingly, the gear teeth 30 of each projection 26 at one end of a link member as shown in FIG. 4 will become engaged with the serrations or gear teeth 34 of the reliefs 32 formed about the tongue 16 of the adjacent link member 12. The meshing engagement of the respective gears is, of course, permitted by virtue of the over-size elongate journal hole 18 as shown in FIG. 4. In such meshed engagement, rotative movement of one link joint in relation to another is prevented thereby causing the cable assembly to become rigid.

Thus provided is a flexible tether system which overcomes "weightlessness" problems in aerospace activity. While the tether system of the present invention is uniquely suited as a restraint and positioning system for an astronaut, nevertheless the device finds application in any other instance wherein a flexible cable must be rigidized in any particular shape or curvature.

The present invention, therefore, is well adapted to carry out the objects and attain the ends and advantages mentioned as well as others inherent therein. While a presently preferred embodiment has been given for the purpose of disclosure, numerous changes in the detail of construction and the combination, shape, size and arrangement of parts may be resorted to without departing from the spirit and the scope of the invention as hereinafter claimed.

What is claimed is:

1. A flexible yet rigidifiable cable assembly comprising:
   (a) a plurality of engageable serrated tongue and groove link means, each said means being journaled to another said means,
   (b) a cable means axially received within each link means (a), and
   (c) means coacting with the link means (a) and the cable means (b) for selectively tensioning the cable means (b) relative to the link means (a).

2. The cable assembly of claim 1 wherein each link means of the plurality of engageable serrated and tongue groove link means (a) comprises:
   an elongate link member having an axial bore receiving the cable means (b),
   serrated groove means integrally formed of the first end of the link member, and
   serrated tongue means integrally formed at the second end of the link member.

3. The device of claim 2 wherein the serrated groove means integrally formed at the first end of the link member, comprises:
   two spaced, parallel projections providing a slot therebetween, the projections being of an approximate semi-circular configuration in the parallel planes, and
   each projection having gear teeth serrated at the apex thereof perpendicular to said parallel planes.

4. The device of claim 2 wherein the serrated tongue means integrally formed at the second end of the link member, comprises,
   a tongue formed by parallel, semicircular reliefs on opposed sides of the tongue, and
   the innermost, semi-circular surfaces of the reliefs having gear teeth serrated thereon perpendicular to the plane of the tongue.

5. The device of claim 1 wherein the means (c) for selectively tensioning the cable means (b) relative to the link means (a), comprises,
   spring means between each link means (a) for biasing each link means (a) apart from one another, and
   lever actuating means for placing tension on the cable means (b) to overcome the bias of said spring means.

6. A flexible yet rigidifiable cable assembly device, comprising
   (a) a plurality of elongate link members each having an axial bore and each including
      (i) at the first end two spaced, parallel projections providing a slot therebetween, the projections being of an approximate semi-circular configuration in the parallel planes, and each projection having gear teeth serrated at the apex thereof perpendicular to said parallel planes,
      (ii) at the second end a tongue formed by parallel, semi-circular reliefs on opposed sides of the tongue, the innermost, semi-circular surfaces of the reliefs having gear teeth serrated thereon perpendicular to the plane of the tongue, (b) means for interconnecting each of the link members (a) by journaling the first end of one link member (a) to the second end of another link member (a), (c) spring means between each link member (a) for biasing each said link member apart from one another, (d) a cable extending through the axial bore of each link member (a), and (e) actuating means coacting with the link members (a) and cable (d) for placing tension on the cable (d) to overcome the bias of the spring means (c) whereby the gear teeth of the projections at the first end of the link members (a) may meshingly engage wtih the gear teeth of the tongues at the second end of the link members (a).

7. The device of claim 6 wherein the means (b) for interconnecting each of the link members (a) comprises, journal pins secured to and projecting from the radii centers of each tongue (a)(ii) and received in journal holes at the radii centers of the semi-circular parallel projections (a)(i), said journal holes being of larger diameter than the journal pins so as to provide limited axial movement of each link member (a) relative to its adjoining link member (a).

8. The device of claim 6 wherein the planes of the parallel projections (a)(i) are perpendicular relative to the plane of the tongue (a)(ii).

9. The device of claim 6 wherein the spring means (c) comprises a bow spring having an aperture to receive the cable (b) and being mounted within the slot provided between the parallel projections (a)(i) so as to bear against the innermost surface of said slot and the apex surface of the tongue (a)(ii).

References Cited
UNITED STATES PATENTS 3,546,961    12/1970    Marton _____ 74—501 R MILTON KAUFMAN, Primary Examiner U.S. Cl. X.R.

248—278